United States Patent
Lee et al.

(10) Patent No.: US 9,004,367 B2
(45) Date of Patent: Apr. 14, 2015

(54) RADIO FREQUENCY IDENTIFICATION (RFID) TAG AND METHOD OF UPDATING KEY OF RFID TAG

(71) Applicant: Electronics and Telecommunications Research Institute, Daejeon (KR)

(72) Inventors: Sang Yeoun Lee, Daejeon (KR); Joo Sang Park, Daejeon (KR); Heyung Sub Lee, Daejeon (KR); Chan Won Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/081,424

(22) Filed: Nov. 15, 2013

(65) Prior Publication Data
US 2014/0138448 A1    May 22, 2014

(30) Foreign Application Priority Data

Nov. 16, 2012 (KR) .................. 10-2012-0130149

(51) Int. Cl.
| | | |
|---|---|---|
| G06K 19/00 | (2006.01) | |
| G06K 19/07 | (2006.01) | |
| H04L 9/08 | (2006.01) | |
| G06F 21/35 | (2013.01) | |
| H04W 12/04 | (2009.01) | |
| H04L 9/32 | (2006.01) | |

(52) U.S. Cl.
CPC .......... *G06K 19/0723* (2013.01); *H04L 9/0891* (2013.01); *H04L 9/32* (2013.01); *H04L 2209/805* (2013.01); *G06F 21/35* (2013.01); *H04W 12/04* (2013.01)

(58) Field of Classification Search
CPC .. G06K 19/07749; G07F 7/08; G07F 7/10008
USPC ................. 235/492, 487, 382, 380
See application file for complete search history.

(56) References Cited

U.S. PATENT DOCUMENTS

| | | | |
|---|---|---|---|
| 8,176,323 B2 | 5/2012 | Anemikos et al. | |
| 2008/0012690 A1* | 1/2008 | Friedrich | 340/10.1 |
| 2010/0017617 A1* | 1/2010 | Lee et al. | 713/185 |
| 2012/0262280 A1* | 10/2012 | Tseng et al. | 340/10.5 |

* cited by examiner

*Primary Examiner* — Daniel St Cyr
(74) *Attorney, Agent, or Firm* — Rabin & Berdo, P.C.

(57) ABSTRACT

In relation to a security function of a radio frequency identification (RFID) tag, an RFID tag and a method of updating a key of the RFID tag that may manage a key to be used for an access to a reader by storing the key in a memory having a duplex structure, thereby minimizing an update error occurring during a process of updating the key are provided.

10 Claims, 3 Drawing Sheets

RADIO FREQUENCY IDENTIFICATION (RFID) TAG AND METHOD OF UPDATING KEY OF RFID TAG

CROSS-REFERENCE TO RELATED APPLICATION

This application claims the benefit of Korean Patent Application No. 10-2012-0130149, filed on Nov. 16, 2012, in the Korean Intellectual Property Office, the disclosure of which is incorporated herein by reference.

BACKGROUND

1. Field of the Invention

The present invention relates to a security function of a radio frequency identification (RFID) tag, and more particularly, to an RFID tag and a method of updating a key of the RFID tag that may manage a key to be used for an access to a reader by recording the key in a memory having a duplex structure, thereby minimizing an update error occurring during a process of updating the key.

2. Description of the Related Art

In general, a passive radio frequency identification (RFID) tag may operate using power supplied from an RFID reader. Since the RFID reader may simultaneously supply the power and perform a separate event task, for example, an operation of writing data in a memory of the RFID tag, a considerable time and resources may be consumed.

In addition, when communication with the RFID reader is unstable, the passive RFID tag may have issues in that incorrect data may be recorded in the memory due to a lack of power or a reset during the process of writing data.

In this instance, an operation of correcting an error in data, for example, re-writing may be performed in the RFID tag by the RFID reader.

However, the RFID tag still has issues in that the re-writing may consume time and resources, and communication between the RFID tag and the RFID reader may not be performed during the re-writing.

Accordingly, there is a demand for technologies for minimizing a malfunction during the operation of writing the key, by configuring the memory of the RFID tag in a duplex structure.

SUMMARY

An aspect of the present invention provides a radio frequency identification (RFID) tag and a method of updating a key of the RFID tag that may provide a plurality of memories, and record a key newly input from an RFID reader for update, separately from an existing key.

Another aspect of the present invention also provides an RFID tag and a method of updating a key of the RFID tag that may configure a key to be stored in a memory to have a duplex structure, thereby preventing a malfunction occurring during a process of updating the key.

Still another aspect of the present invention also provides an RFID tag and a method of updating a key of the RFID tag that may suspend an operation of writing a key or invalidate a key for update recorded in a separate memory, when an error is expected to occur during an updating process, thereby preventing communication with an RFID reader from being discontinued due to updates.

According to an aspect of the present invention, there is provided an RFID tag including a first memory to record a first key to be used for an access to an RFID reader, a second memory, distinct from the first memory, to record a second key transmitted from the accessed RFID reader, an inspector to generate a check value inspected in relation to the second key, in response to an input of a check value from the RFID reader, and a processor to determine the second key to be a key to be used for the access to the RFID reader, when the generated check value corresponds to the input check value.

According to another aspect of the present invention, there is also provided a method of updating a key of an RFID tag, the method including recording a first key to be used for an access to an RFID reader in a first memory, recording a second key transmitted from the accessed RFID reader in a second memory distinct from the first memory, generating a check value inspected in relation to the second key, in response to an input of a check value from the RFID reader, and determining the second key to be a key to be used for the access to the RFID reader, when the generated check value corresponds to the input check value.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
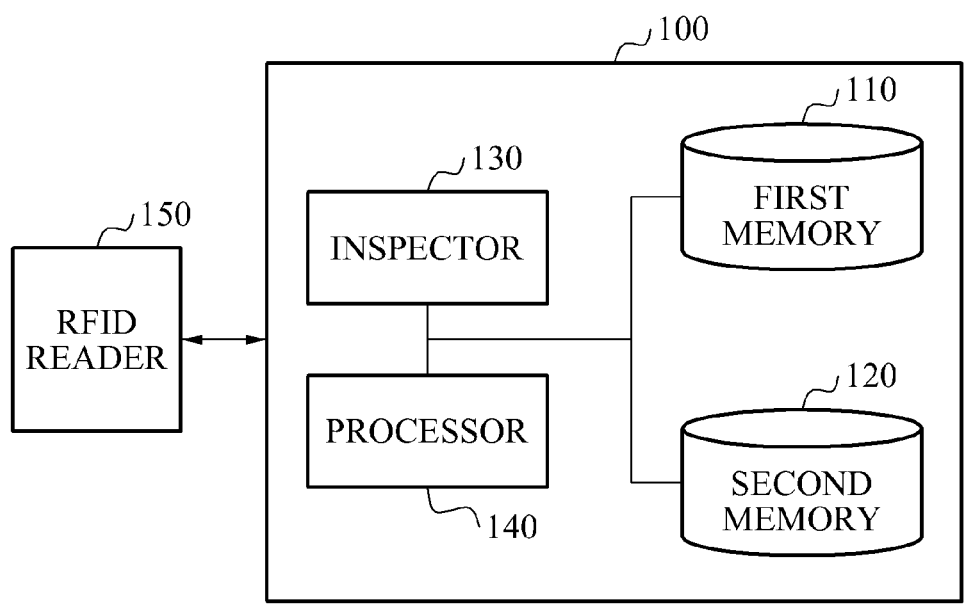
FIG. 1 is a block diagram illustrating a configuration of a radio frequency identification (RFID) tag according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

The term "key" used herein throughout refers to a key that may be recorded and maintained in a memory of a radio frequency identification (RFID) tag to be used for authentication between an RFID reader and the RFID tag, and in general, may not be read by the RFID reader. The key may be recorded in a memory when the RFID tag is manufactured, or may be recorded frequently in a memory by a writing process performed by the RFID reader during an access to the RFID reader.

FIG. 1 is a diagram illustrating a configuration of an RFID tag 100 according to an embodiment of the present invention.

Referring to FIG. 1, the RFID tag 100 may include a first memory 110, a second memory 120, an inspector 130, and a processor 140.

The first memory 110 may record a first key to be used for an access to an RFID reader 150. The first memory 110 may store the first key as a secret key pre-contracted with the RFID reader 150. The first key may be written by a manufacturer when the RFID tag 100 is manufactured, and registered in the first memory 110, or may be uploaded from the RFID reader 150 during a previous update, and recorded in the first memory 110.

When the RFID tag 100 is close to the RFID reader 150, the RFID tag 100 may read the first key from the first memory 110, and perform a determined authentication procedure. When an approval signal is generated according to the authentication procedure, the RFID tag 100 may allow an access to the RFID reader 150.

The second memory 120 may correspond to a storage means distinct from the first memory 110, and record a second key transmitted from the accessed RFID reader 150. The second key may correspond to a new secret key for update to be used for an access to the RFID tag 100, and may be input from the manufacturer of the RFID tag 100 or a server connected online to the RFID reader 150.

The second memory 120 may record and maintain the second key newly input from the RFID reader 150 while the first key currently being used is recorded and maintained in the first memory 110.

The first memory 110 and the second memory 120 may be implemented to be physically separated from each other, or implemented in a form of separate and distinct storage areas in a single memory. The first key and the second key may be individually recorded and maintained in separate and distinct storage areas in a single memory.

When the RFID reader 150 additionally updates the key newly after the second key is updated, the first memory 110 may store the newly updated key. In particular, a duplex structure of a key may be implemented by performing an update of a key in the second memory 120 after an update of a key in the first memory 110 is performed, and performing an update of a key in the first memory 110 after an update of a key in the second memory 120 is performed.

The inspector 130 may generate a check value inspected in relation to the second key, when a check value is input from the RFID reader 150. The inspector 130 may output the check value with respect to the second key in order to verify whether the second key transmitted by the RFID reader 150 is normally stored in the memory of the RFID tag 100.

As an example of generating the check value, the inspector 130 may generate the check value by reading the second key from the second memory 120 and calculating a cyclic redundancy check (CRC) checksum. The CRC checksum refers to a scheme of determining a check value to be used for verifying whether an error is present in transmitted data when the data is transmitted over a network.

When the RFID reader 150 calculates a CRC value based on a value of the data for inspection associated with the second key, and transmits the calculated CRC value along with the data for inspection, the inspector 130 may change and update the data for inspection, by reflecting a result of inspecting the RFID tag 100 using the second key.

When the generated check value corresponds to the input check value, the processor 140 may determine the second key to be the key to be used for the access to the RFID reader 150. When it is verified that the two values correspond to each other as a result of comparing the generated check value to the check value input from the RFID reader 150, the processor 140 may determine the second key to be a new key to be used for the access to the RFID reader 150.

As an example, when the second key is determined to be the key to be used for the access to the RFID reader 150, the processor 140 may invalidate the first key in the first memory 110. The processor 140 may suspend use of the previously used first key for the determined second key to be used for a future access to the RFID reader 150, thereby completing an update with respect to a key. In addition, the processor 140 may convert the first memory 110 to an extra memory, thereby preparing for a future upgrade to a new key for update.

As another example, when the generated check value does not correspond to the input check value, the processing unit 140 may maintain use of the first key as the key to be used for the access to the RFID reader 150, and invalidate the second key in the second memory 120. When it is verified that the two values differ from each other as a result of comparing the two values, the processor 140 may recognize an occurrence of an error, invalidate an upgrade of the second key, and continuously use the first key. In addition, the processor 140 may convert the second memory 120 to an extra memory, thereby preparing for a future upgrade to a new key for update.

As still another example, when a reset occurs while the second key is being recorded in the second memory 120, or when the check value is not input from the RFID reader 150 within a predetermined time after the second key is recorded in the second memory 120, the processor 140 may maintain use of the first key as the key to be used for the access to the RFID reader 150, and invalidate the second key in the second memory 120. When an action in which an error is expected occurs during a process of updating a key, the processor 140 may invalidate an upgrade to the second key, and continuously use the first key. In addition, the processor 140 may convert the second memory 120 to an extra memory, thereby preparing for a future upgrade to a new key for update.

According to an aspect of the present invention, a plurality of memories may be provided, and a key newly input from the RFID reader 150 for update may be recorded separately in another memory, other than a memory in which an existing key is recorded.

According to another aspect of the present invention, a key to be stored in a memory may be configured to have a duplex structure, whereby a malfunction occurring during a process of updating the key may be prevented.

According to still another aspect of the present invention, by suspending an operation of writing a key or invalidating a key for update recorded in a separate memory, when an error is expected to occur during an updating process, communication with an RFID reader may be prevented from being discontinued due to updates.

Figure 2:
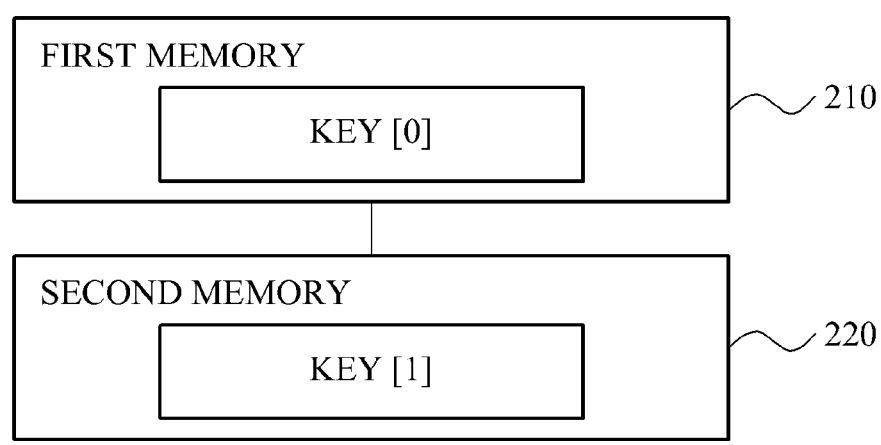
FIG. 2 is a block diagram illustrating an example of a duplex structure of a key stored in a memory of an RFID tag according to an embodiment of the present invention.

FIG. 2 is a block diagram illustrating an example of a duplex structure of a key stored in a memory of an RFID tag according to an embodiment of the present invention.

Referring to FIG. 2, positions of a first memory 210 and a second memory 220 may be determined by a manufacturer manufacturing the RFID tag 100 of FIG. 1. When a command to update a new key, for example, a second key, is transmitted by the RFID reader 150 of FIG. 1 while a currently used key, for example, a first key, is stored in KEY [0] of the first memory 210, the RFID tag 100 may store received data in KEY [1] of the second memory 220.

When the RFID reader 150 transmits a CRCChecksum value to inspect the entire second key while all data are received and stored completely, the RFID tag 100 may read the data stored in KEY [1] of the second memory 220 to generate a CRCChecksum, and compare the generated CRCChecksum to the CRCChecksum value transmitted by the RFID reader 150. When the generated CRCChecksum is identical to the CRCChecksum value, the second key stored in KEY [1] of the second memory 220 may be applied as a new key.

When the generated CRCChecksum is not identical to the CRCChecksum value, the RFID tag 100 may recognize that an error occurs during a process of updating the second key, ignore the second key stored in KEY [1] of the second memory 220, and continuously use the first key stored in KEY [0] of the previous memory, for example, the first memory 210.

Through such an operation, an error occurring during the process of updating the key between the RFID reader 150 and the RFID tag 100 may be prevented in advance.

Although FIG. 2 illustrates the first key and the second key are maintained in the first memory 210 and the second memory 220 provided separately, depending on an embodiment, the first key and the second key may be individually maintained in separate and distinct storage areas within a single memory.

Hereinafter, a workflow of updating a key of an RFID tag according to an embodiment of the present invention will be described in detail.

Figure 3:
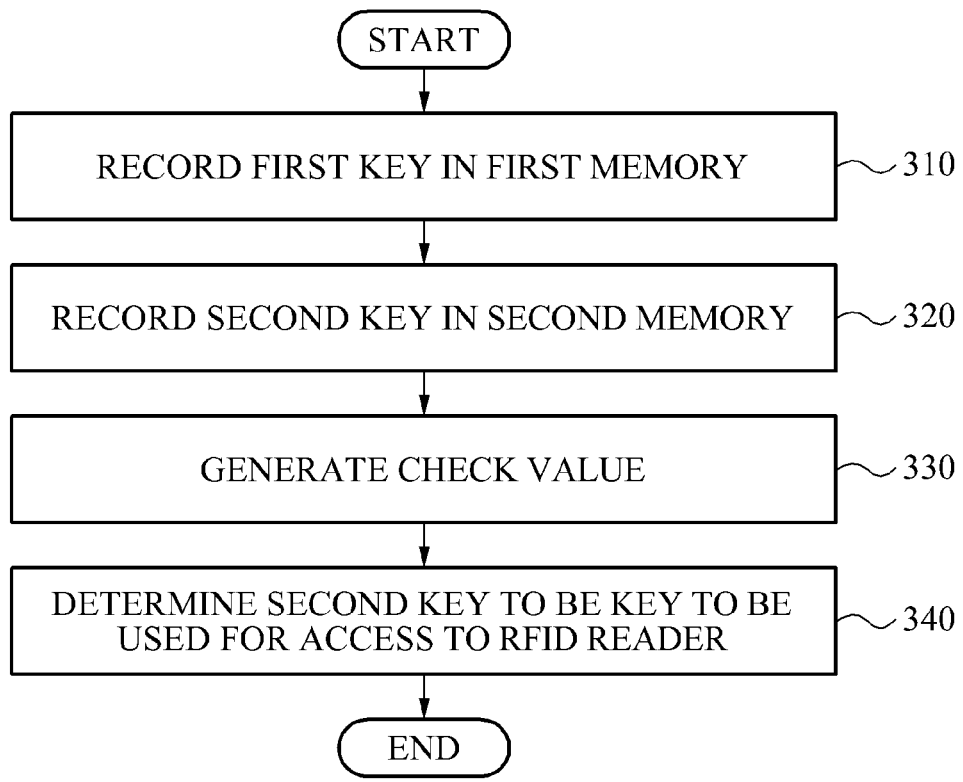
FIG. 3 is a flowchart illustrating a method of updating a key of an RFID tag according to an embodiment of the present invention.

FIG. 3 is a flowchart illustrating a method of updating a key of an RFID tag according to an embodiment of the present invention.

The method of updating the key of the RFID tag may be performed by the RFID tag 100 of FIG. 1.

In operation 310, a first key to be used for an access to the RFID reader 150 may be recorded in the first memory 110. Operation 310 may correspond to a process of storing the first key in the first memory 110 as a secret key pre-contracted with the RFID reader 150. When the RFID tag 100 is close to the RFID reader 150, the RFID tag 100 may read the first key from the first memory 110 and perform a determined authentication procedure. When an approval signal is generated according to the authentication procedure, the RFID tag 100 may allow an access to the RFID reader 150.

In operation 320, a second key transmitted from the accessed RFID reader 150 may be recorded in the second memory 120 distinct from the first memory 110. Operation 320 may correspond to a process of recording and maintaining the second key newly input from the RFID reader 150 in the second memory 120, while the first key currently being used is recorded and maintained in the first memory 110.

In operation 330, a check value inspected in relation to the second key may be generated when a check value is input from the RFID reader 150. Operation 330 may correspond to a process of outputting the check value with respect to the second key in order to verify whether the second key transmitted by the RFID reader 150 is normally stored in the memory of the RFID tag 100.

As an example of generating the check value, the check value may be generated by reading the second key from the second memory 120 and calculating a CRC checksum.

When the generated check value corresponds to the input check value, the second key may be determined to be the key to be used for the access to the RFID reader 150, in operation 340. Operation 340 may correspond to a process of determining the second key to be a new key to be used for the access to the RFID reader 150, when it is verified that the two values correspond to each other as a result of comparing the generated check value to the check value input from the RFID reader 150.

As an example, when the second key is determined to be the key to be used for the access to the RFID reader 150, the first key may be invalidated in the first memory 110. Use of the previously used first key may be suspend for the determined second key to be used for a future access to the RFID reader 150, whereby an update with respect to a key may be completed.

As another example, when the generated check value does not correspond to the input check value, use of the first key as the key to be used for the access to the RFID reader 150 may be maintained, and the second key may be invalidated in the second memory 120. When it is verified that the two values differ from each other as a result of comparing the two values, an occurrence of an error may be recognized, an upgrade of the second key may be invalidated, and the first key may be continuously used.

As still another example, when a reset occurs while the second key is being recorded in the second memory 120, or when the check value is not input from the RFID reader 150 within a predetermined time after the second key is recorded in the second memory 120, use of the first key as the key to be used for the access to the RFID reader 150 may be maintained, and the second key may be invalidated in the second memory 120. When an action in which an error is expected occurs during a process of updating a key, an upgrade to the second key may be invalidated, and the first key may be continuously used.

According to an aspect of the present invention, a plurality of memories may be provided, and a key newly input from the RFID reader 150 for update may be recorded separately in another memory, other than a memory in which an existing key is recorded.

According to another aspect of the present invention, a key to be stored in a memory may be configured to have a duplex structure, whereby a malfunction occurring during a to process of updating the key may be prevented.

According to still another aspect of the present invention, by suspending an operation of writing a key or invalidating a key for update recorded in a separate memory, when an error is expected to occur during an updating process, communication with an RFID reader may be prevented from being discontinued due to updates.

The method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

According to an aspect of the present invention, it is possible to provide an RFID tag and a method of updating a key of the RFID tag that may provide a plurality of memories, and record a key newly input from an RFID reader separately in another memory, other than a memory in which an existing key is recorded.

According to another aspect of the present invention, it is possible to provide an RFID tag and a method of updating a key of the RFID tag that may configure a key to be stored in a memory to have a duplex structure, thereby preventing a malfunction occurring to during a process of updating the key.

According to still another aspect of the present invention, it is possible to provide an RFID tag and a method of updating a key of the RFID tag that may suspend an operation of writing a key or invalidate a key for update recorded in a separate memory, when an error is expected to occur during an updating process, thereby preventing communication with an RFID reader from being discontinued due to updates.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A radio frequency identification (RFID) tag comprising:
a first memory to record a first key to be used for an access to an RFID reader;
a second memory, distinct from the first memory, to record a second key transmitted from the accessed RFID reader;
an inspector to generate a check value inspected in relation to the second key, in response to an input of a check value from the RFID reader; and
a processor to determine the second key to be a key to be used for the access to the RFID reader, when the generated check value corresponds to the input check value;
wherein the processor maintains use of the first key as the key to be used for the access to the RFID reader and invalidates the second key in the second memory, when a reset occurs while the second key is being recorded in the second memory, or when the check value is not input from the RFID reader within a predetermined time after the second key is recorded in the second memory.

2. The RFID tag of claim 1, wherein the processor invalidates the first key in the first memory, when the second key is determined to be the key to be used for the access to the RFID reader.

3. The RFID tag of claim 1, wherein the processor maintains use of the first key as the key to be used for the access to the RFID reader and invalidates the second key in the second memory, when the generated check value does not correspond to the input check value.

4. The RFID tag of claim 1, wherein the inspector generates the check value by reading the second key from the second memory and calculating a cyclic redundancy check (CRC) checksum.

5. The RFID tag of claim 1, wherein the first memory and the second memory correspond to separate and distinct storage areas in a single memory, and
the first key and the second key are individually recorded in the storage areas, respectively.

6. The RFID tag of claim 1, wherein, when a new key is transmitted from the accessed RFID reader, the first memory records the new key.

7. A method of updating a key of a radio frequency identification (RFID) tag, the method comprising:
recording a first key to be used for an access to an RFID reader in a first memory;
recording a second key transmitted from the accessed RFID reader in a second memory distinct from the first memory;
generating a check value inspected in relation to the second key, in response to an input of a check value from the RFID reader; and
determining the second key to be a key to be used for the access to the RFID reader, when the generated check value corresponds to the input check value;
maintaining use of the first key as the key to be used for the access to the RFID reader and invalidating the second key in the second memory, when a reset occurs while the second key is being recorded in the second memory, or when the check value is not input from the RFID reader within a predetermined time after the second key is recorded in the second memory.

8. The method of claim 7, further comprising:
invalidating the first key in the first memory when the second key is determined to be the key to be used for the access to the RFID reader.

9. The method of claim 7, further comprising:
invalidating the second key in the second memory when the generated check value does not correspond to the input check value.

10. The method of claim 7, where in the generating comprises generating the check value by reading the second key from the second memory and calculating a cyclic redundancy check (CRC) checksum.

* * * * *